March 30, 1937.  H. T. SEELEY  2,075,666
CONTROL SYSTEM
Filed May 21, 1935
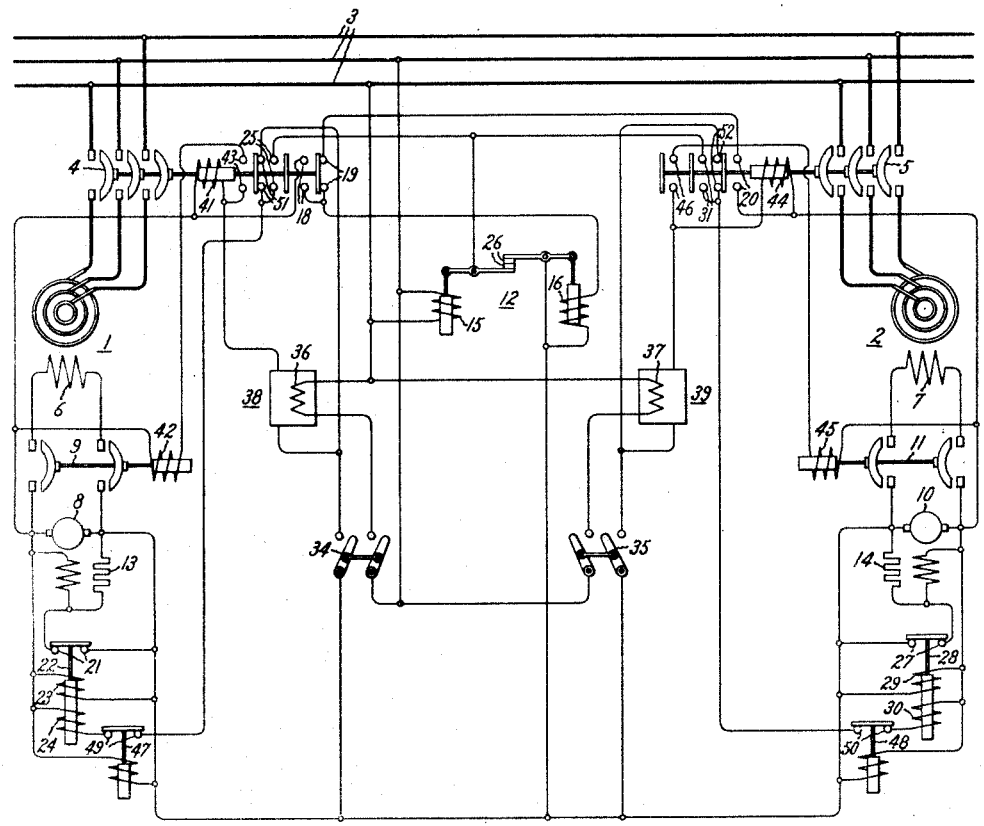
Inventor:
Harold T. Seeley,
by Harry E. Dunham
His Attorney.

Patented Mar. 30, 1937

2,075,666

UNITED STATES PATENT OFFICE 2,075,666

CONTROL SYSTEM

Harold T. Seeley, Lansdowne, Pa., assignor to General Electric Company, a corporation of New York Application May 21, 1935, Serial No. 22,565

6 Claims. (Cl. 171—118)

My invention relates to control systems and particularly to systems for controlling the voltage of an exciter for a generator, and one object of my invention is to provide an exciter voltage control system which, prior to the connection of the generator to the load circuit to be supplied thereby, maintains the exciter voltage at a predetermined value that is sufficient to allow the exciter to be used as a source of control current for operating the electroresponsive switching means that connects the generator to the load circuit, and which, after the generator is connected to the load circuit, controls the exciter voltage so as to maintain the load circuit voltage at a predetermined value.

Another object of my invention is to provide, in a multiple unit generating station in which each generator is provided with a separate exciter, an exciter voltage control system which, prior to the connection of each generator to the common load circuit, maintains the voltage of the exciter associated with the disconnected generator at a predetermined value, and which, after the connection of a generator to the common load circuit, places the voltage of the exciter associated with the connected generator under the control of a common voltage relay, which is responsive to the load circuit voltage.

My invention will be better understood from the following description when taken in connection with the accompanying drawing, the single figure of which diagrammatically illustrates an exciter voltage control system embodying my invention, and its scope will be pointed out in the appended claims.

Referring to the drawing, 1 and 2 represent two alternating current generators which are arranged to be connected to a common alternating current load circuit 3 by suitable switching means 4 and 5, respectively. The generators 1 2 are provided with the field windings 6 and 7, respectively. The field winding 6 is arranged to be connected to an exciter 8 by means of a suitable field switch 9 and the field winding 7 is arranged to be connected to another exciter 10 by means of a suitable field switch 11.

During the normal operation of the generators 1 and 2, the exciters 8 and 10 are controlled by a single voltage regulator 12, which may be of any suitable type, examples of which are well known in the art, so as to maintain a predetermined load circuit voltage. As shown in the drawing, the voltage regulator 12 is of the well-known Tirrill type, which controls a short-circuit around the resistances 13 and 14, which are respectively connected in the shunt field circuits of the exciters 8 and 10. The regulator 12 includes a voltage relay 15 connected across one of the phases of load circuit 3 and a direct current relay 16, which is arranged to be connected across one of the exciters whenever its associated generator is connected to the load circuit 3 and to be connected across the other exciter whenever its associated generator is the only generator connected to the load circuit 3. As shown in the drawing, the relay 16 is connected across the exciter 8 whenever the switching means 4, associated with the generator 1, is closed so that its auxiliary contacts 18 are closed and is connected across the exciter 10 when the switching means 4 is open so that its auxiliary contacts 19 are closed and the switching means 5 associated with the generator 2 is closed so that its auxiliary contacts 20 are closed.

The short-circuit around the resistor 13 is completed through the contacts 21 of an auxiliary relay 22 which is provided with the differential windings 23 and 24. The winding 23 is permanently connected across the exciter 8, and the winding 24 is connected across the exciter 8 when the switching means 4 is closed so that its auxiliary contacts 25 are closed and the contacts 26 of the regulator 12 are closed. The short-circuit around the resistor 14 is completed through the contacts 27 of an auxiliary relay 28 which is provided with the differential windings 29 and 30. The winding 29 is permanently connected across the exciter 10 and the winding 30 is arranged to be connected across the exciter 10 when the switching means 5 is closed so that its auxiliary contacts 31 are closed and the contacts 26 of the regulator 12 are closed. Consequently, when both of the generators 1 and 2 are connected to the load circuit 3, the closing of the regulator contacts 26 effects the closing of the short-circuits around both of the resistors 13 and 14, and the opening of the regulator contacts 26 effects the opening of the short-circuits around the resistors 13 and 14. The regulator 12 operates in a manner well known in the art to effect the opening and closing of its contacts 26 in accordance with the load circuit voltage so that the exciter voltages are controlled to maintain the load circuit voltage at a predetermined value.

The starting of each generator and the closing of its field switch and switching means which connects the generator to the load circuit may be effected, either manually or automatically, in any suitable manner, examples of which are well known in the art. The details of an automatic switching arrangement for effecting these various operations are immaterial so far as my present invention is concerned and, therefore, I have deemed it advisable to show only enough of such an automatic switching arrangement as will permit one readily to understand the operation and utility of my invention. In such automatic switching arrangements, the starting of the generator is usually effected by the operation of a suitable control device, such as a switch, which effects the energization of a master-control relay. The energization of the master-control relay then effects the starting of the generator from rest and its synchronization with the line to which it is to supply current. Various arrangements well known in the art may be employed for bringing the generator into synchronism.

As shown in the drawing, the generators 1 and 2 are respectively provided with suitable control devices 34 and 35 shown as hand-switches which, when closed, effect the energization of the master-control relays 36 and 37 respectively of suitable automatic switching means 38 and 39. The automatic switching means 38 is arranged in any suitable manner to start the generator 1 from rest and to connect the closing coil 41 of the switching means 4 across the terminals of the exciter 8 when the generator 1 reaches a predetermined speed during its starting operation. As soon as the switching means 4 closes to connect the generator 1 to the load circuit 3, its auxiliary contacts 43 connect the closing coil 42 of the field switch 9 across the terminals of the exciter 8 to close the field switch 9 so as to excite the field winding 6 and pull the generator 1 into synchronism.

The automatic switching means 39 is arranged in a similar manner to start the generator 2, when the master relay 37 is energized, to connect the closing coil 44 of the switching means 5 across the terminals of the exciter 10 when the generator 2 reaches a predetermined speed and to connect the closing coil 45 of the field switch 11 across the terminals of the exciter 10 after the switching means 5 has closed its auxiliary contacts 46.

Since the closing coils 41 and 42 are energized by the exciter 8 during the starting operation of the generator 1, and the closing coils 44 and 45 are energized by the exciter 10 during the starting operation of the generator 2, it is necessary that the voltages of these exciters should be high enough to cause the closing coils, when connected thereto, to close their respective switches. In order to accomplish this result, I remove the control of each exciter from the voltage regulator 12 whenever its associated generator is disconnected from the load circuit 3 and provide suitable control means so that during the starting operation of the associated generator, each exciter is regulated so that the voltage thereof is maintained at a value sufficient to operate the electro-responsive devices connected thereto. This result is accomplished in the arrangement shown in the drawing by having the switching means 4, when it is open, disconnect the winding 24 of the relay 22 from the contacts 26 of the voltage regulator 12 and connect it so that its energization is controlled by the contacts 49 of a voltage relay 47, which is connected so as to be responsive to the voltage of the exciter 8, and by having the switching means 5, when it is open, disconnect the winding 30 of the relay 28 from the contacts 26 of the voltage regulator 12 and connect it so that its energization is controlled only by the contacts 50 of a voltage relay 48, which is connected so as to be responsive to the voltage of the exciter 10. The relays 47 and 48 are arranged to maintain their respective contacts 49 and 50 closed when the voltages of the associated exciters are below predetermined values. The contacts 49 of the relay 47 are connected in a circuit across the exciter 8 in series with the winding 24 of relay 22, the auxiliary contacts 51 on the switching means 4 when it is open and the contacts of the control switch 34 when it is closed. Therefore, during the starting operation of the generator 1, the relay 22 is energized so as to control the excitation of the exciter 8 in such a manner as to maintain the exciter voltage at a predetermined value which depends upon the setting of the voltage relay 47. The contacts 50 of relay 48 are connected in a circuit across the exciter 10 in series with the winding 30 of the relay 28, the auxiliary contacts 52 on the switching means 5 when it is open and contacts of the control switch 35 when it is closed. Therefore, during the starting operation of the generator 2, the relay 28 is energized so as to control the excitation of the exciter 10 in such a manner as to maintain the exciter voltage at a predetermined value which depends upon the setting of the voltage relay 48.

The operation of the arrangement shown in the drawing is as follows: It will first be assumed that both generators are disconnected from the load circuit 3 and that the control switch 34 is closed to effect the starting of the generator 1. The closing of the switch 34 completes an energizing circuit for the master-control relay 36 across one of the phases of the load circuit 3, which, it is assumed, is energized by another source, not shown. The energization of the master-control relay 36 effects the operation of the automatic switching means 38 to start the generator 1 and after it has reached approximately synchronous speed, a circuit is completed for the closing coil 41 of the switching means 4 across the exciter 8, to connect the generator 1 to the load circuit 3 with the field winding 6 unexcited. The closing of the auxiliary contacts 43 on the switching means 4 completes an energizing circuit for the closing coil 42 of the field switch 9 across the exciter 8 so that the field winding 6 is energized to pull the generator 1 into synchronism.

In order that the voltage of the exciter 8 may be high enough to operate the switches 4 and 9 during the starting operation of the generator 1, the control switch 34, when closed, also completes an energizing circuit for the winding 24 of the relay 22 while the auxiliary contacts 51 of the switching means 4 and the contacts 49 of the voltage relay 47 are simultaneously closed. Therefore, after the control switch 34 is closed and until the switching means 4 is closed, the voltage relay 47 controls the excitation of the exciter 8 so as to maintain the voltage thereof at a predetermined value. When the switching means 4 is closed to connect the generator 1 to the load circuit 3, the opening of the auxiliary contacts 51 and the closing of the auxiliary contacts 25 on the switching means 4 transfers the circuit of the winding 24 to the contacts 26 of the voltage regulator 12 so that the exciter is thereafter controlled by the regulator 12 in a well known manner, so as to maintain the load circuit voltage at a predetermined value.

When the switching means 4 is closed, the auxiliary contacts 18 thereof connect the voltage winding 16 of the regulator 12 across the exciter 8.

The generator 2 is placed in operation by closing the control switch 35 so that it completes an energizing circuit for the master-control relay 37 across one of the phases of the load circuit 3. The energization of the master-control relay 37 effects the operation of the automatic switching means 39 to start the generator 2 and, after it has reached approximately synchronous speed, a circuit is completed for the closing coil 44 of the switching means 5 across the exciter 10 to connect the generator 2 to the load circuit 3 with the field winding 7 unexcited. The closing of the auxiliary contacts 46 on the switching means 5 completes an energizing circuit for the closing coil 45 of the field switch 11 across the exciter 10 so that the field winding 7 is energized to pull the generator 2 into synchronism.

In order that the voltage of the exciter 10 may be high enough to operate the switches 5 and 11, the closing of the control switch 35 also completes an energizing circuit for the winding 30 of the relay 28 while the auxiliary contacts 52 of the switching means 5 and the contacts 50 of the voltage relay 48 are simultaneously closed. Therefore, after the switch 35 is closed and until the switching means 5 is closed to connect the generator 2 to the load circuit 3, the voltage relay 48 controls the excitation of the exciter 10 so as to maintain the voltage thereof at a predetermined value. When the switching means 5 is closed to connect the generator 2 to the load circuit 3, the opening of the auxiliary contacts 52 and the closing of the auxiliary contacts 31 on the switching means 5 transfers the circuit of the winding 30 of relay 28 to the contacts of the voltage regulator 12 so that the exciter 10 is thereafter controlled by the regulator 12 so as to maintain the load circuit voltage at a predetermined value.

In order that the relay 16 of the voltage regulator 12 may be energized in accordance with the voltage of the exciter 10 when only the generator 2 is in operation, a circuit for this relay is completed across the exciter 10 through the auxiliary contacts 19 on the switching means 4 and the auxiliary contacts 20 on the switching means 5 when the switching means 4 is open and the switching means 5 is closed.

It will be evident from the above description that the voltage of each exciter prior to the connection of its associated generator to the load circuit 3 is regulated so that it is maintained at a predetermined value which is sufficient to allow the exciter to be used as a source of control current for operating the electro-responsive switching means that connects the associated generator to the load circuit and is controlled after the associated generator is connected to the load circuit so as to maintain the load circuit voltage at a predetermined value.

While I have, in accordance with the Patent Statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:—

1. In combination, an electric circuit, a plurality of generators, switching means for connecting each generator to said circuit, a separate exciter for each generator, a single voltage regulator responsive to the voltage of said circuit, and means controlled by said switching means for regulating the excitation of an exciter in response to the voltage thereof so as to maintain a predetermined exciter voltage when the associated generator is disconnected from said circuit and for causing said voltage regulator to regulate the excitation of each exciter when the associated generator is connected to said circuit.

2. In combination, an electric circuit, a plurality of generators, switching means for connecting each generator to said circuit, a separate exciter for each generator, a relay responsive to the voltage of said circuit, control relays respectively responsive to the voltages of said exciters, and means controlled by said switching means for placing the excitation of an exciter under the control of its associated control relay when the associated generator is not connected to said circuit so as to maintain the exciter voltage at a predetermined value and under the control of said first mentioned relay so as to maintain the circuit voltage at a predetermined value when the associated generator is connected to said circuit.

3. In combination, an electric circuit, a plurality of generators, switching means for connecting each generator to said circuit, a separate exciter for each generator, an auxiliary relay associated with each exciter and having one winding connected across the associated exciter and a differential winding connected across the associated exciter, and means controlled by said switching means for controlling the circuit of each differential winding across the associated exciter so that the voltage thereof is maintained at a predetermined value while the associated generator is disconnected from said electric circuit and is regulated to maintain the voltage of said electric circuit at a predetermined value, when the associated generator is connected to said electric circuit.

4. In combination, an electric circuit, a plurality of generators, switching means for connecting each generator to said circuit, a separate exciter for each generator, an auxiliary relay associated with each exciter and having one winding connected across the associated exciter and a differential winding connected across the associated exciter, a single voltage regulator responsive to the voltage of said circuit, a voltage relay responsive to the voltage of each exciter, and means controlled by said switching means for placing the control of each differential winding under the control of its associated voltage relay when the associated generator is disconnected from said electric circuit and under the control of said voltage regulator when the associated generator is connected to said electric circuit.

5. In combination, an electric circuit, a generator, an exciter for said generator, switching means for connecting said generator to said circuit, a relay responsive to the voltage of said electric circuit, a second relay responsive to the voltage of said exciter, and means controlled by said switching means for placing the excitation of said exciter under the control of said second relay when said generator is disconnected from said circuit and under the control of said first mentioned relay when said generator is connected to said circuit.

6. In combination, an electric circuit, a generator, an exciter for said generator, switching means for connecting said generator to said circuit, a relay responsive to the voltage of said electric circuit, a second relay responsive to the voltage of said exciter, an auxiliary relay associated with said exciter and having a winding connected across said exciter and a differential winding, two circuits for said differential winding, and means controlled by said switching means for placing one of said circuits of said differential winding under the control of said second relay when said generator is disconnected from said electric circuit and the other of said circuits of said differential winding under the control of said first mentioned relay when the associated generator is connected to said electric circuit.

HAROLD T. SEELEY.